US010242642B2

(12) United States Patent
Lee et al.

(10) Patent No.: US 10,242,642 B2
(45) Date of Patent: Mar. 26, 2019

(54) MOBILE TERMINAL AND CONTROL METHOD THEREFOR

(71) Applicant: LG ELECTRONICS INC., Seoul (KR)

(72) Inventors: Younghak Lee, Seoul (KR); Sungkyu Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 172 days.

(21) Appl. No.: 15/112,377

(22) PCT Filed: Sep. 23, 2014

(86) PCT No.: PCT/KR2014/008855
§ 371 (c)(1),
(2) Date: Jul. 18, 2016

(87) PCT Pub. No.: WO2016/035920
PCT Pub. Date: Mar. 10, 2016

(65) Prior Publication Data
US 2016/0335983 A1   Nov. 17, 2016

(30) Foreign Application Priority Data
Sep. 2, 2014 (KR) .................. 10-2014-0116346

(51) Int. Cl.
G09G 5/00      (2006.01)
H04W 4/02     (2018.01)
(Continued)

(52) U.S. Cl.
CPC ......... *G09G 5/006* (2013.01); *G01C 21/3632* (2013.01); *G01C 21/3667* (2013.01);
(Continued)

(58) Field of Classification Search
CPC ............... G09G 5/006; G01C 21/3632; G01C 21/3667; H04W 4/02; H04W 4/046
See application file for complete search history.

(56) References Cited

U.S. PATENT DOCUMENTS

2006/0103590 A1* 5/2006 Divon .................... G02B 27/01
345/7
2009/0072999 A1* 3/2009 Yu ........................ G01C 21/365
340/907
(Continued)

FOREIGN PATENT DOCUMENTS

EP            2682859 A2 *  8/2014   ............... G06F 3/14
KR   10-2010-0012945 A      2/2010
(Continued)

Primary Examiner — Calvin Cheung
(74) Attorney, Agent, or Firm — Birch, Stewart, Kolasch & Birch, LLP

(57) ABSTRACT

The present disclosure relates to a mobile terminal capable of cooperating with a transparent display apparatus and a method for controlling the same, wherein the mobile terminal capable of cooperating with the transparent display apparatus includes a wireless communication unit capable of performing transmission and reception of information with the transparent display apparatus, a display unit capable of outputting path search information, and a controller capable of transmitting screen information related to the path search information to the cooperative transparent display apparatus, through the wireless communication unit such that the screen information related to the path search.

7 Claims, 13 Drawing Sheets

(51) Int. Cl.
  *G01C 21/36* (2006.01)
  *H04W 4/04* (2009.01)
  *H04W 88/02* (2009.01)
  *H04W 4/06* (2009.01)
(52) U.S. Cl.
  CPC ............ *H04W 4/02* (2013.01); *H04W 4/046* (2013.01); *G09G 2360/04* (2013.01); *G09G 2370/16* (2013.01); *G09G 2380/10* (2013.01); *H04W 4/027* (2013.01); *H04W 4/06* (2013.01); *H04W 88/02* (2013.01)

(56) References Cited

U.S. PATENT DOCUMENTS

| 2011/0093190 | A1* | 4/2011 | Yoon | G01C 21/365 |
| --- | --- | --- | --- | --- |
| | | | | 701/533 |
| 2012/0191342 | A1* | 7/2012 | Kang | G01C 21/365 |
| | | | | 701/423 |
| 2012/0226437 | A1* | 9/2012 | Li | G01C 21/3647 |
| | | | | 701/423 |
| 2014/0036374 | A1* | 2/2014 | Lescure | G02B 27/0101 |
| | | | | 359/630 |
| 2014/0063064 | A1* | 3/2014 | Seo | G08G 1/166 |
| | | | | 345/633 |
| 2015/0195147 | A1* | 7/2015 | Jee | H04W 76/23 |
| | | | | 715/740 |
| 2015/0211878 | A1* | 7/2015 | Jiyama | G01C 21/365 |
| | | | | 701/439 |
| 2015/0317044 | A1* | 11/2015 | Abe | G01C 21/365 |
| | | | | 345/629 |
| 2016/0092154 | A1* | 3/2016 | Bourlier | G06F 3/1454 |
| | | | | 345/2.2 |
| 2016/0124224 | A1* | 5/2016 | Moon | B60K 35/00 |
| | | | | 359/630 |
| 2016/0371813 | A1* | 12/2016 | Fujie | B60W 50/14 |
| 2017/0120819 | A1* | 5/2017 | Arita | B60R 1/00 |

FOREIGN PATENT DOCUMENTS

| KR | 10-2010-0075315 A | 7/2010 |
| --- | --- | --- |
| KR | 10-1034426 B1 | 5/2011 |
| KR | 10-2011-0114114 A | 10/2011 |
| KR | 10-2013-0068357 A | 6/2013 |
| WO | WO 2015/083909 A1 | 6/2015 |

* cited by examiner

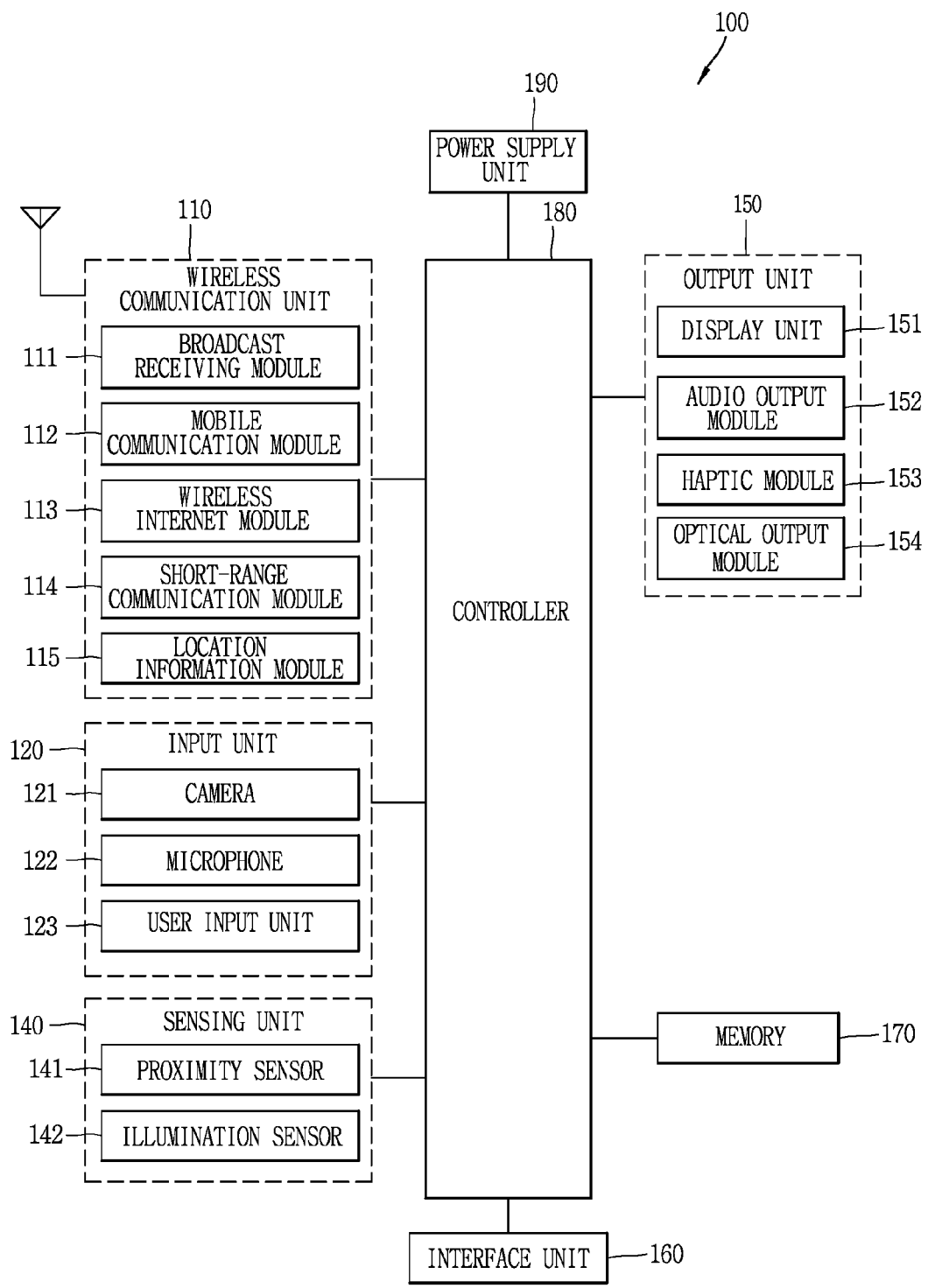

(a)

(b)

↓ CALL ENDED (c)

MOBILE TERMINAL AND CONTROL METHOD THEREFOR

CROSS REFERENCE TO RELATED APPLICATIONS

This application is the National Phase of PCT International Application No. PCT/KR2014/008855, filed on Sep. 23, 2014, which claims priority under 35 U.S.C. 119(a) to patent application Ser. No. 10-2014-0116346, filed in Republic of Korea on Sep. 2, 2014, all of which are hereby expressly incorporated by reference into the present application.

TECHNICAL FIELD

The present disclosure relates to a mobile terminal capable of cooperating with a transparent display apparatus, and a method for controlling the same.

BACKGROUND ART

Terminals may be divided into mobile/portable terminals and stationary terminals according to their mobility. Also, the mobile terminals may be classified into handheld terminals and vehicle mount terminals according to whether or not a user can directly carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

Meanwhile, as functions of a terminal are diversified and complicated, a user feels several inconveniences in use of such functions. Accordingly, in recent time, various technologies for providing various functions to the user more easily and conveniently have been developed.

In relation to such technology development, the present invention can provide various functions in a manner of operating a display unit of a terminal and a transparent display apparatus in a cooperating manner.

DISCLOSURE OF THE INVENTION

Therefore, an aspect of the detailed description is to provide a method of complementing a limit of a size of a display unit by utilizing a transparent display apparatus as an external device, in a mobile terminal with a size-limited display unit for the purpose of convenience in mobility of the terminal.

Another aspect of the detailed description is to provide a method of utilizing a transparent display unit located in front of user's eyes, under an environment of being difficult to ensure a viewing angle with respect to a display unit of a terminal.

To achieve these and other advantages and in accordance with the purpose of the present invention, as embodied and broadly described herein, there is provided a mobile terminal cooperating with a transparent display apparatus, the mobile terminal including a wireless communication unit capable of performing transmission and reception of information with the transparent display apparatus, a display unit capable of outputting path search information, and a controller capable of transmitting screen information related to the path search information to the cooperative transparent display apparatus, through the wireless communication unit such that the screen information related to the path search information is output on the cooperative transparent display apparatus.

In one exemplary embodiment, the mobile terminal may further include a main body, and a location receiving unit capable of receiving location information related to the main body. The controller may transmit road information based on a location of the main body to the transparent display apparatus such that the road information is output on the transparent display apparatus.

In one exemplary embodiment, the controller may further transmit information related to a direction to move to the transparent display apparatus such that a guide image indicating the direction to move is output on the road information in an overlapping manner.

In one exemplary embodiment, the controller may terminate the path search function when the main body arrives at a destination, and transmit destination building image information such that the building image of the destination is output on the transparent display apparatus.

In one exemplary embodiment, the controller may transmit road information at a changed location such that the road information at the changed location is output on the transparent display apparatus, when the location of the main body changes.

In one exemplary embodiment, the road information may be output on the transparent display apparatus when a preset condition is met.

In one exemplary embodiment, the controller may transmit the road image information to the transparent display apparatus such that the road image information is output on the transparent display apparatus, when the direction that the main body is expected to move is a left turn or a right turn.

In one exemplary embodiment, the controller may transmit a control signal to the transparent display apparatus such that the road image information disappears from the transparent display apparatus, when it is sensed that the main body has been turned to left or right.

A mobile terminal cooperating with a transparent display apparatus according to the present invention may include a wireless communication unit capable of performing transmission and reception of information with the transparent display apparatus, a display unit capable of outputting path search information, and a controller capable of transmitting information related to a reception of a call signal or a message to the transparent display apparatus such that screen information related to the reception of the call signal or message is output on the transparent display apparatus, when the call signal or message is received while the path search information is output on the display unit.

In one exemplary embodiment, the controller may control the screen information related to the reception of the call signal or message, currently output on the transparent display apparatus, to disappear from the transparent display apparatus when a preset condition is met.

In one exemplary embodiment, the preset condition may be a condition associated with at least one of a voice command and a gesture command.

A mobile terminal cooperating with a transparent display apparatus according to the present invention may include a wireless communication unit capable of performing transmission and reception of information with the transparent display apparatus, a display unit capable of outputting path search information, a camera capable of capturing an external image, and a controller capable of capturing an external image through a camera while the path search information is output on the display unit, wherein the controller may control the transparent display apparatus to output the external image on a transparent display unit on the basis of a preset control command.

In one exemplary embodiment, the controller may transmit an image captured before a preset time interval on the basis of a current time, such that the image is reproduced on the transparent display apparatus, when a reproduction command for the image captured before the preset time interval on the basis of the current time is received.

In one exemplary embodiment, the controller may control the transparent display apparatus not to output the image on the transparent display unit when the reproduction of the image is terminated.

To achieve these and other advantages and in accordance with the purpose of the present invention, as embodied and broadly described herein, there is provided a method for controlling a mobile terminal, in a control method of a mobile terminal cooperating with a transparent display apparatus, the method including outputting path search information, and transmitting information related to the path search information to the transparent display apparatus such that the information related to the path search information is output on a transparent display unit provided on the transparent display apparatus.

In one exemplary embodiment, the method may further include receiving location information related to the mobile terminal. A road image at a current location of the mobile terminal may be transmitted to the transparent display apparatus such that the road image is output on the transparent display unit.

A method for controlling a mobile terminal, in a control method of a mobile terminal cooperating with a transparent display apparatus may include outputting path search information on a display unit, receiving a call signal or message while the path search information is output on the display unit, and transmitting information related to the call signal or message to the transparent display apparatus such that information related to the call signal or message is output on a transparent display unit.

In one exemplary embodiment, details of the call signal or message output on the transparent display may disappear when a preset condition is met.

A method for controlling a mobile terminal, in a control method of a mobile terminal cooperating with a transparent display apparatus may include outputting path search information on a display unit, capturing an external image through a camera while the path search information is output on the display unit, and transmitting the external image to the transparent display apparatus such that the external image is output on a transparent display unit, when a preset control command is received.

In one exemplary embodiment, the external image may disappear from the transparent display unit when a reproduction of the external image is terminated.

Advantageous Effect

The present invention can transmit information related to screen information output on a display unit of a terminal to a transparent display apparatus such that the information related to the screen information output on the display unit can be output on the transparent display apparatus.

Accordingly, the user can be provided with information related to the screen information currently output on the terminal, by using the transparent display apparatus located within a viewing angle, even though the terminal does not belong to the viewing angle.

Also, the present invention can output road scene information on the transparent display apparatus under a complicated road condition, in the mobile terminal performing a path search function, thereby providing a screen similar to a real environment.

This may more facilitate the user to recognize a road condition by virtue of simultaneously recognizing the transparent display apparatus disposed on a front surface of a vehicle and a real road.

BRIEF DESCRIPTION OF THE DRAWINGS

FIG. 1A is a block diagram of a mobile terminal in accordance with the present disclosure.

MODES FOR CARRYING OUT THE PREFERRED EMBODIMENTS

Figure 1B:
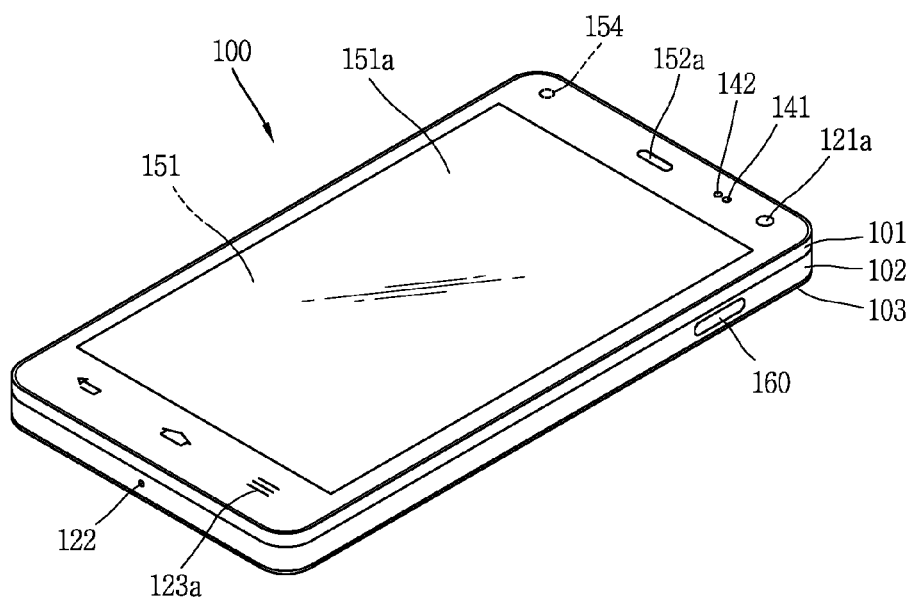
FIGS. 1B and 1C are conceptual views of one example of the mobile terminal, viewed from different directions.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1C:
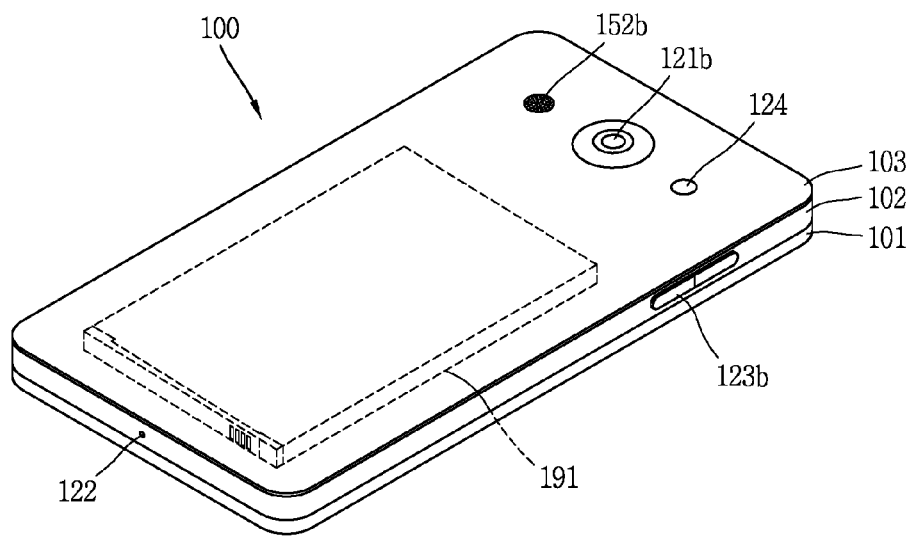

Referring to FIGS. 1A to 1C, FIG. 1A is a block diagram of a mobile terminal in accordance with one exemplary embodiment of the present invention, and FIGS. 1B and 1C are conceptual views illustrating one example of a mobile terminal, viewed from different directions.

The mobile terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 may control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Wideband CDMA (WCDMA), High Speed Downlink Packet access (HSDPA), High Speed Uplink Packet Access (HSUPA), Long Term Evolution (LTE), LTE-advanced (LTE-A) and the like).

Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 performs such wireless Internet access.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs to the mobile terminal 120. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160. When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type the body of the portable electronic device. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of portable electronic device (for example, bar-type, watch-type, glasses-type, and the like). However, such teachings with regard to a particular type of portable electronic device will generally apply to other types of mobile terminals as well.

The body of the mobile terminal may be understood to indicate the mobile terminal 100 by regarding the mobile terminal 100 as at least one assembly.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule alarm, an email reception, information reception through an application, and the like. When a user has checked a generated event, the controller 180 can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

When the rear input unit is provided at the rear surface of the terminal body, a new type of user interface using this may be implemented. Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage. The second camera 121b is shown located at the rear side of the terminal body and includes an image capturing direction that is substantially opposite to the image capturing direction of the first camera unit 121a.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, description will be given of a communication system operable with a mobile terminal 100 according to the present invention.

First, such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS) (specifically, the Long Term Evolution (LTE) and LTE-advanced (LTE-A), the Global System for Mobile Communications (GSM), and the like).

By way of non-limiting example only, further description will relate to a CDMA communication system, but such teachings apply equally to other system types including an Orthogonal Frequency Division Multiplexing (OFDM) wireless communication system as well as the CDMA wireless communication system.

A CDMA wireless communication system is shown having a plurality of mobile terminals, a plurality of base stations (BSs), base station controllers (BSCs), and a mobile switching center (MSC). The MSC is configured to interface with a conventional Public Switch Telephone Network (PSTN). The MSC is also configured to interface with the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 (FIG. 1) is typically configured inside the mobile terminal 100 to receive broadcast signals transmitted by the BT.

In addition, the CDMA wireless communication system may be linked to a Global Positioning system (GPS) for checking a position of the mobile terminal 100. Such satellites 300 facilitate locating the position of the mobile terminal 100. Two satellites are depicted but it is understood that useful position information may be obtained with greater or fewer satellites than two satellites. Here, the positioning of the mobile terminal 100 may be carried out by using every positioning technology as well as the GPS positioning technology. Also, at least one of the GPS satellites may alternatively or additionally be configured to provide satellite DMB transmissions.

Hereinafter, embodiments related to a control method which can be implemented in the mobile terminal having such configuration will be described with reference to the accompanying drawings. It can be obvious to those skilled in the art that the present invention can be embodied into other specific forms without departing from the scope and essential features of the present invention.

A mobile terminal according to one exemplary embodiment of the present invention may be provided with a location receiving unit that receives location-related information. Here, the location receiving unit may also be used as the same meaning as the location information module 115, which has been illustrated in FIG. 1.

In this instance, the mobile terminal may perform a path search function associated with the location (or position). Here, the path search function may be a function of finding and informing a path (or route) from a departure to a destination.

In more detail, the mobile terminal may provide on a display unit a path from a departure to a destination using location information and road information. In addition, the mobile terminal may notify a direction to move from a current location of the mobile terminal.

Also, the path search function may be referred to as various names, such as a path guide function, a guide function, and the like.

Figure 2:
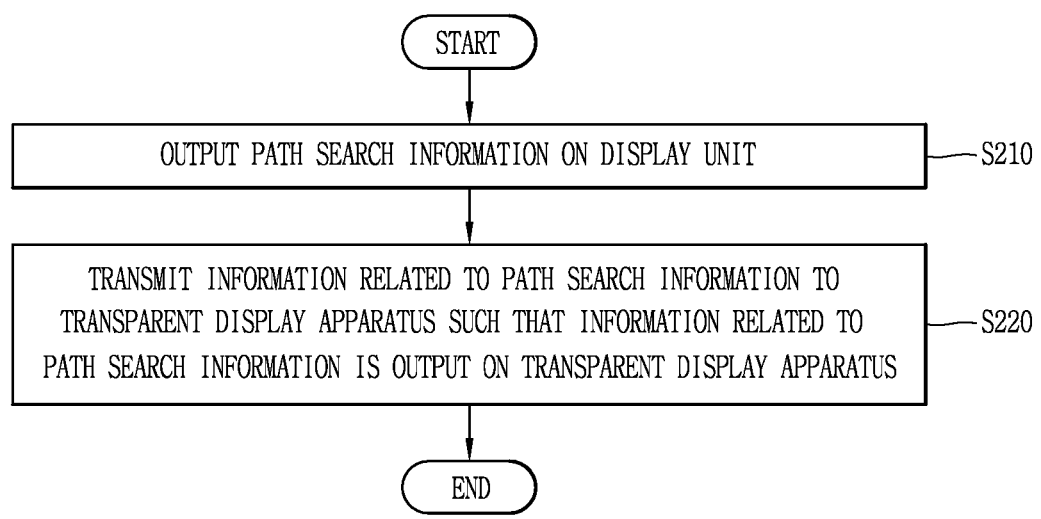
FIG. 2 is a flowchart illustrating a control method in a mobile terminal in accordance with one exemplary embodiment of the present invention.
Figure 3A:
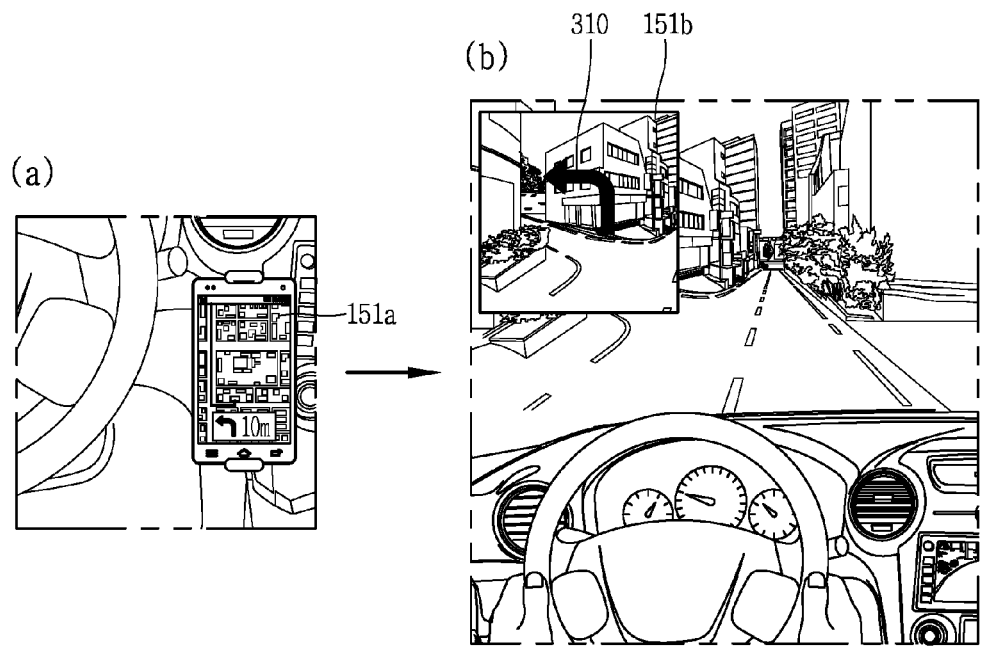
FIGS. 3A and 3B are conceptual views of the control method.
Figure 3B:
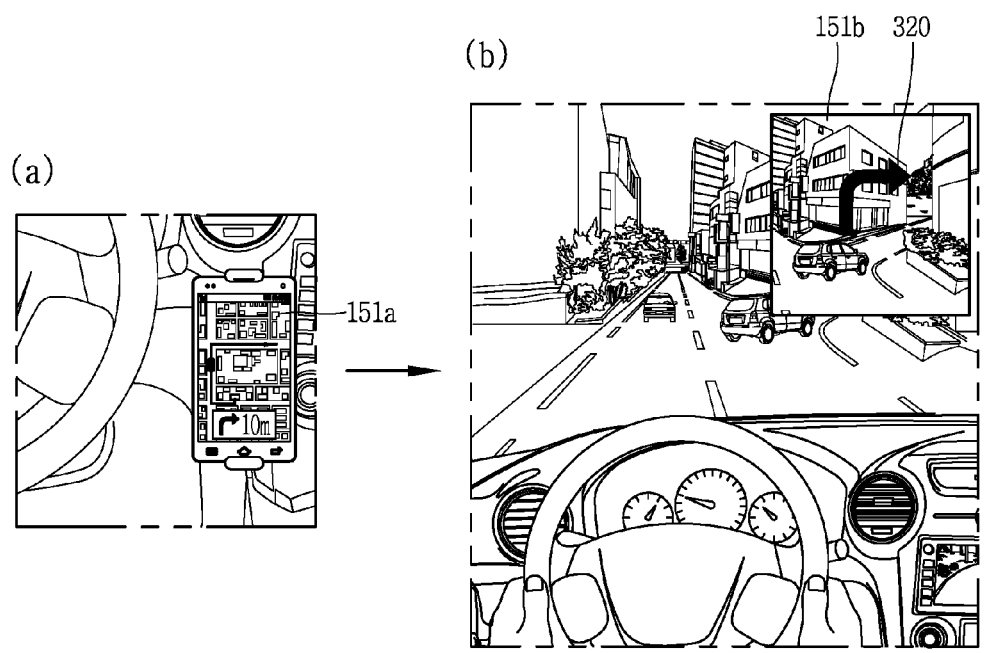

Hereinafter, description will be given in more detail of a method of providing information related to a path search function in a mobile terminal providing the path search function, with reference to the accompanying drawings. FIG. 2 is a flowchart illustrating a control method in a mobile terminal in accordance with one exemplary embodiment of the present invention, and FIGS. 3A and 3B are conceptual views of the control method.

The mobile terminal according to one exemplary embodiment of the present invention may output path search information on the display unit (S210).

The display unit 151*a* may output the path search information thereon. In more detail, the display unit 151*a* may output travel information along with path information from a starting point to a destination. Here, the travel information may be travel (or driving)-related information, such as current location information regarding the mobile terminal, current speed information regarding the mobile terminal, surrounding information at a current location, and the like. Also, the surrounding information may be building information, gas or oil station information, rest area information, and the like, on the basis of a current location.

The travel information may be received from an external server or prestored in the memory 170.

In this instance, the travel information may be received from an external server in real time during an execution of the path search function, or received from the external server according to a preset period. When the path search function is received from the external server, the controller 180 may store the travel information in the memory 170. In this instance, the controller 180 may restore such newly-received travel information when prestored travel information is present in the memory 170.

Also, the controller 180 may decide currently-output travel information according to a current position of the mobile terminal. For example, the controller 180 may output surrounding information at the current position, along with the path search information, by using current position information of the mobile terminal.

For example, the controller 180 may output information related to a gas or oil station located within a preset distance from the current position, along with the path search information, on the display unit 151*a*.

Meanwhile, while the path search information is output on the display unit, the mobile terminal according to the one embodiment of the present invention may transmit information related to the path search information to a transparent display apparatus such that the information related to the path search information can be output on the transparent display apparatus (S220).

The mobile terminal according to the one embodiment disclosed herein may be provided with the wireless communication unit 110 which can perform transmission and reception of information with an external device. Here, the wireless communication unit 110, as illustrated in FIG. 1, may perform communications in various manners.

The external device may be a transparent display apparatus with a transparent display unit 151*b*. The transparent display apparatus may also separately include a wireless communication unit for performing information transmission and reception with the mobile terminal disclosed herein.

The transparent display unit 151*b* of the transparent display apparatus may allow an external object to be visible therethrough and also output screen information processed by a controller.

For example, a user can view not only an external object through the transparent display unit 151*b*, but also screen information related to a function, which is currently executed on the transparent display apparatus, on the transparent display unit 151*b*.

Here, the output of the screen information on the transparent display unit 151*b* may be implemented by various methods, such as a prism method which is used in the related art glass type device, a transparency control method, and the like.

Meanwhile, the transparent display apparatus may be installed on a part or all of a front glass of a vehicle. In this instance, the transparent display apparatus may be located within a front viewing angle of a user driving the vehicle. That is, the user can view screen information output on the transparent display unit 151*b* even during driving of the vehicle.

Also, the transparent display apparatus may output information received from an external device on the transparent display unit 151*b*. In this instance, the external device may be the terminal which is currently executing the path search function according to the one embodiment disclosed herein.

The controller 180 of the mobile terminal may transmit the information related to the path search information to the transparent display apparatus such that the information related to the path search information can be output on the transparent display apparatus.

In this instance, the controller 180 may additionally transmit output status information related to a status that the information related to the path search information is output on the transparent display apparatus.

The information related to the path search information may be road information based on a current location, and the travel (or driving) information. Here, the road information may be an image obtained by capturing a real road. Also, the information related to the path search information may be a guide image indicating a path.

The guide image may be an image indicating a direction expected to move within a preset distance, on the basis of the current location of the mobile terminal. For example, when a left turn is expected at the current location, the guide image may be an arrow image indicating a left-handed direction.

The controller 180 may transmit the information related to the path search information to the transparent display apparatus on the basis of a preset condition. Here, the preset condition may be a condition related to at least one of a reception or non-reception of a location, a call or a message, and a driving state. For example, the preset condition may correspond to whether or not the mobile terminal has arrived at a destination.

In this instance, the controller 180 may transmit different information related to the path search information to the transparent display apparatus according to the preset condition. In more detail, the controller 180 may transmit a building image associated with a destination to the transparent display apparatus when the mobile terminal has arrived at the destination. On the other hand, the mobile terminal may transmit road information to the transparent display apparatus when the mobile terminal is currently in a travel state. This may allow information related to a travel state which changes in real time to be provided through the transparent display apparatus.

Hereinafter, the control method will be described in more detail with reference to the accompanying drawings.

The mobile terminal according to the one exemplary embodiment disclosed herein may transmit the information related to the path search function to the transparent display apparatus while executing the path search function. In this instance, the transparent display apparatus may output the information related to the path search function.

For example, as illustrated in (a) of FIG. 3A, the controller 180 may transmit road information related to the path information to the transplant display apparatus while executing the path search function.

In this instance, the controller 180 may output the road information on at least part of the transparent display unit 151b. For example, as illustrated in (b) of FIG. 3A, the road information may be output on the transparent display unit 151b.

The controller 180 may also output a guide image 310 indicating the path on the transparent display unit 151b when the guide image 310 is transmitted together with the road information. This may result in providing the user with more realistic path information.

Meanwhile, the transparent display apparatus may be provided on an entire front glass of a vehicle. In this instance, the controller 180 may additionally transmit output location information at which the information related to the path search information is to be output on the transparent display unit 151b.

For example, the controller 180 may control the information related to the path search information to be output on an area of the transparent display unit 151b, which is located in a direction corresponding to a direction expected to move at the current position of the mobile terminal.

In more detail, as illustrated in (b) of FIG. 3A, if the direction expected to move at the current position of the mobile terminal is a left direction, the controller 180 may control the transparent display apparatus to output the information related to the path search function on a left area based on a front surface of the transparent display unit 151b.

Also, as illustrated in (b) of FIG. 3B, if the direction expected to move at the current position of the mobile terminal is a right direction, the controller 180 may control the transparent display apparatus to output the information related to the path search function on a right area based on the front surface of the transparent display unit 151b.

Meanwhile, the foregoing description has been given of the case of outputting the information related to the path search information on the transparent display apparatus, but information related to an event generated in the mobile terminal may also be output on the transparent display apparatus. For example, when a message is received on the mobile terminal, a content (details) of the message may be output on the transparent display unit 151b.

Accordingly, the user can be provided with an additional function associated with a path in an ensured state of a front viewing angle during driving. Also, the user can be provided with a real driving environment more intuitively by virtue of information related to the path provided in a direction expected to move.

As such, the foregoing description has been given of the method by which the mobile terminal currently executing the path search function outputs the information related to the path search function on the transparent display apparatus.

Figure 4A:
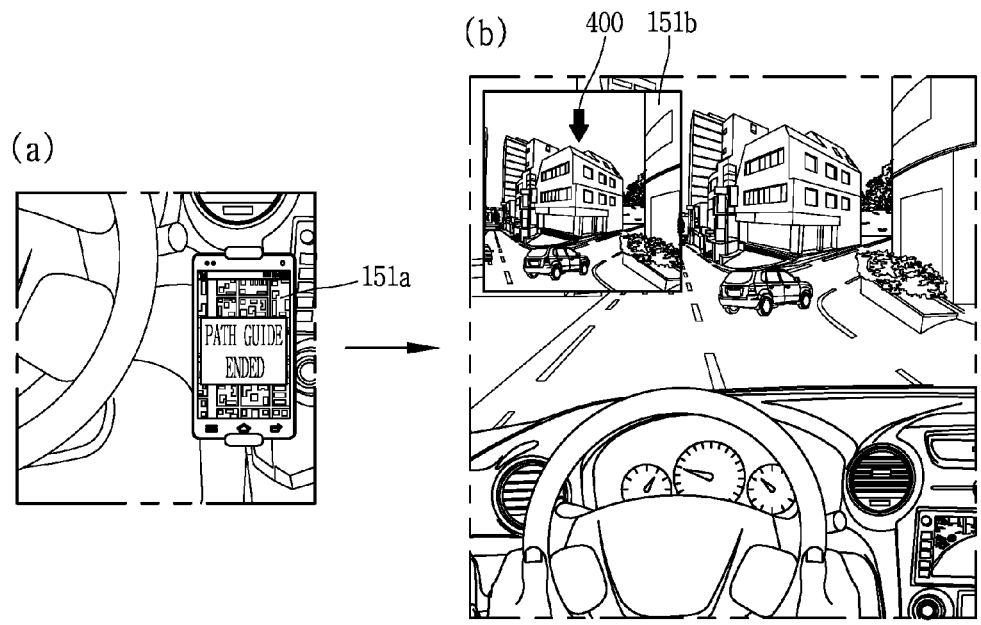
FIGS. 4A and 4B are conceptual views illustrating providing of additional information after a mobile terminal arrives at a preset destination.
Figure 4B:
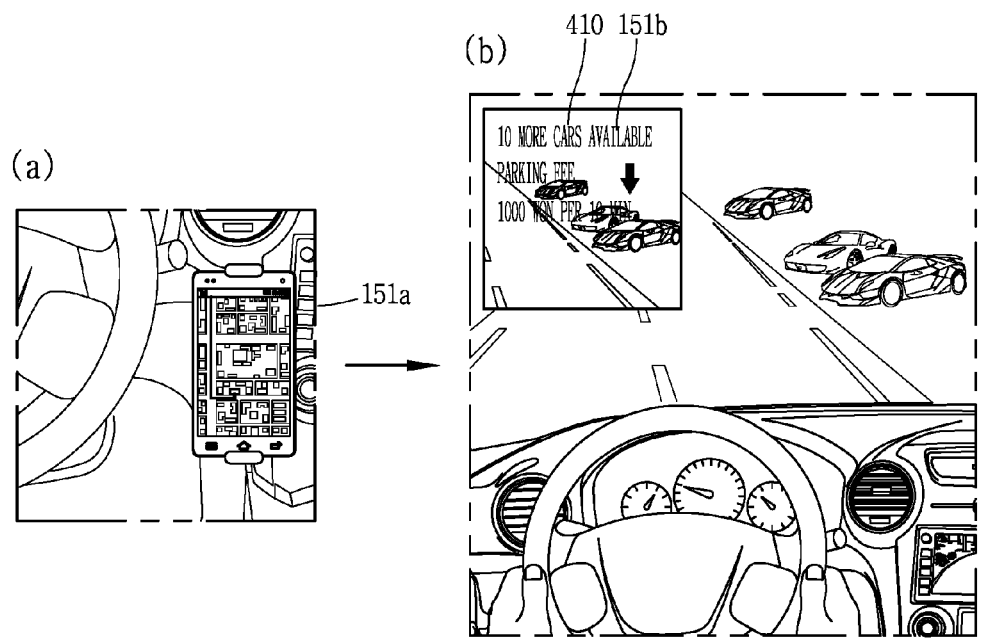

Hereinafter, a type of information output on the transparent display apparatus when the mobile terminal arrives at a preset destination will be described. FIGS. 4A and 4B are conceptual views illustrating providing of additional information after the mobile terminal arrives at the preset destination.

The controller 180 may terminate (end) the path search function when it is determined that the mobile terminal has arrived at the location of the destination. In this instance, the user may be likely to fail to find a correct destination building in spite of the termination of the path search function.

Accordingly, the present invention can provide the user with the building image of the destination as well as the location of the destination.

In this instance, the building image of the destination may be output on the display unit 151a of the mobile terminal, but may also be provided using the transparent display apparatus provided on the front glass of the vehicle.

For example, as illustrated in (a) of FIG. 4A, the controller 180 may terminate the path search function when it is determined that the mobile terminal is currently located at the location of the destination. Afterwards, the controller 180 may transmit the building image information to the transparent display unit such that the building image of the destination can be output on the transparent display unit.

In this instance, as illustrated in (b) of FIG. 4A, the controller 180 may control the transparent display apparatus to output the building image information of the destination on one area of the transparent display unit 151b.

Also, the controller 180 may further transmit information related to a guide image 400 indicating the destination building to the transparent display apparatus such that the guide image 400 can be output on the transparent display apparatus.

Meanwhile, although not illustrated, the transparent display unit 151b may be arranged on the entire front glass of the vehicle. In this instance, the controller 180 may detect an area corresponding to the location of the destination building on the transparent display unit 151b provided on the front surface. The controller 180 may also output the guide image indicating the destination building on a position corresponding to the location of the building which is the destination.

That is, the present invention can provide a guide image on a real building which is viewed on the front glass of the vehicle. This may allow the user to get more correct and realistic path search information.

In addition, when a destination is a parking lot, the controller 180 may further receive information 410 related to a current parking lot from a communication unit which is installed at the parking lot. The information related to the parking lot may be a current parking availability, parking fee information, and the like.

Also, the controller 180 may transmit the information 410 related to the parking lot to the transparent display apparatus such that the information received from the parking lot can be output on the transparent display unit 151*b*.

For example, as illustrated in (b) of FIG. 4B, the controller 180 may control the transparent display apparatus to output the information 410 related to the parking lot on one area of the transparent display unit 151*b*. Accordingly, the user can be additionally provided with the information related to the destination after arrival at the destination.

Figure 5A:
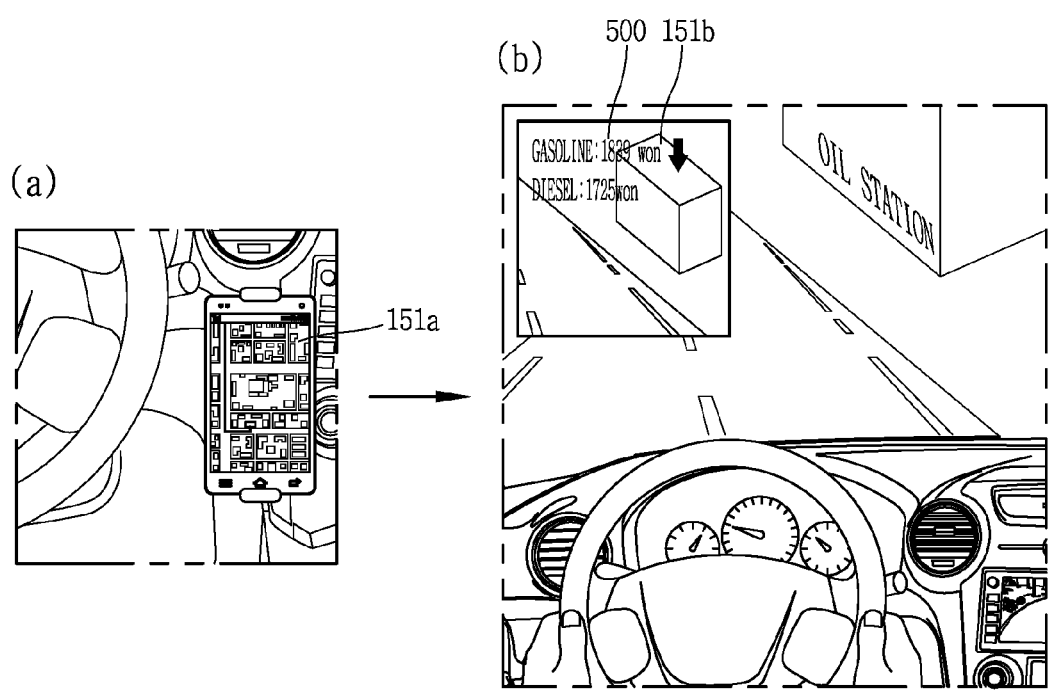
FIGS. 5A and 5B are conceptual views illustrating providing of additional information during travel (driving).
Figure 5B:
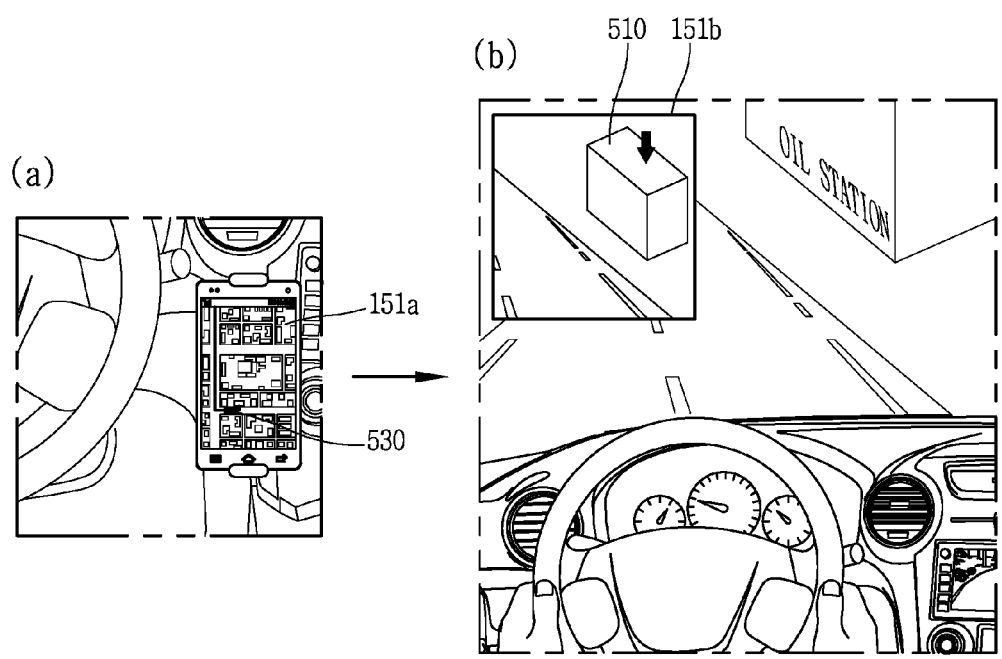
Figure 5B:
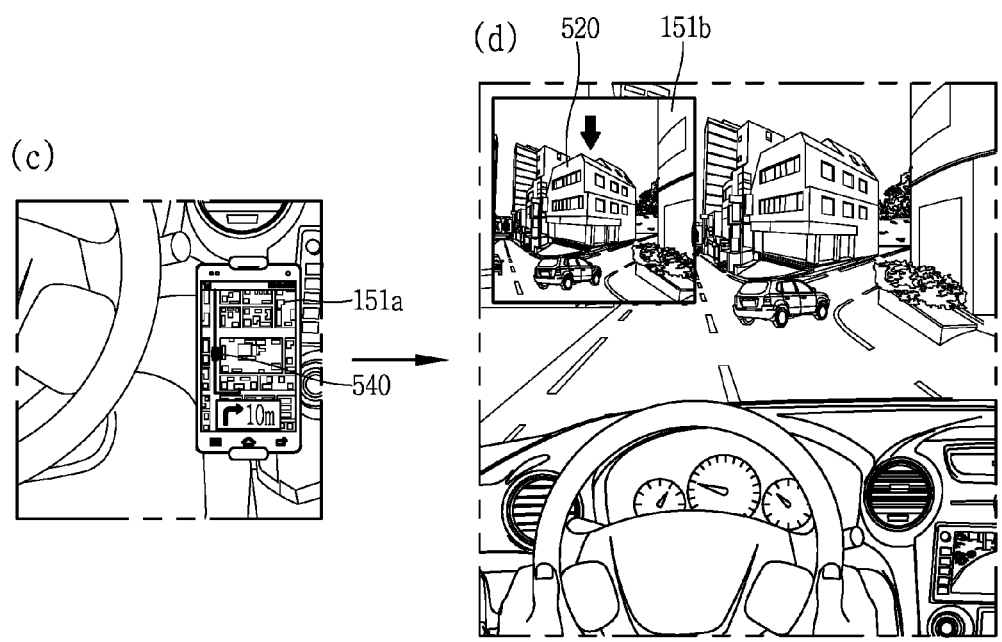

So far, the method of providing the additional information after the termination of the path search function has been described. Hereinafter, a method of providing additional information during driving will be described. FIGS. 5A and 5B are conceptual views illustrating providing of additional information during driving.

The present invention may receive current location information in real time during driving. In this instance, the controller 180 may output surrounding information at a current location on the transparent display unit 151*b*, on the basis of the current location information.

For example, as illustrated in (b) of FIG. 5A, when a gas or oil station is located near a current location, the controller 180 may transmit information 500 related to the gas or oil station to the transparent display apparatus such that the information 500 can be output on the transparent display apparatus.

Also, as the current location changes, the controller 180 may transmit surrounding information related to the changed location to the transparent display apparatus such that the surrounding information can be output on the transparent display apparatus.

In more detail, as illustrated in (a) and (b) of FIG. 5B, the controller 180 may control the transparent display apparatus to output surrounding information 510 at a current location of the mobile terminal on the transparent display unit 151*b*.

In this instance, as illustrated in (c) and (d) of FIG. 5B, when the current location of the mobile terminal changes, the controller 180 may control the transparent display apparatus to output surrounding information 520 at the changed current location on the transparent display unit 151*b*.

That is, the present invention can change information output on the transparent display apparatus in real time on the basis of a current location of the mobile terminal.

Figure 6A:
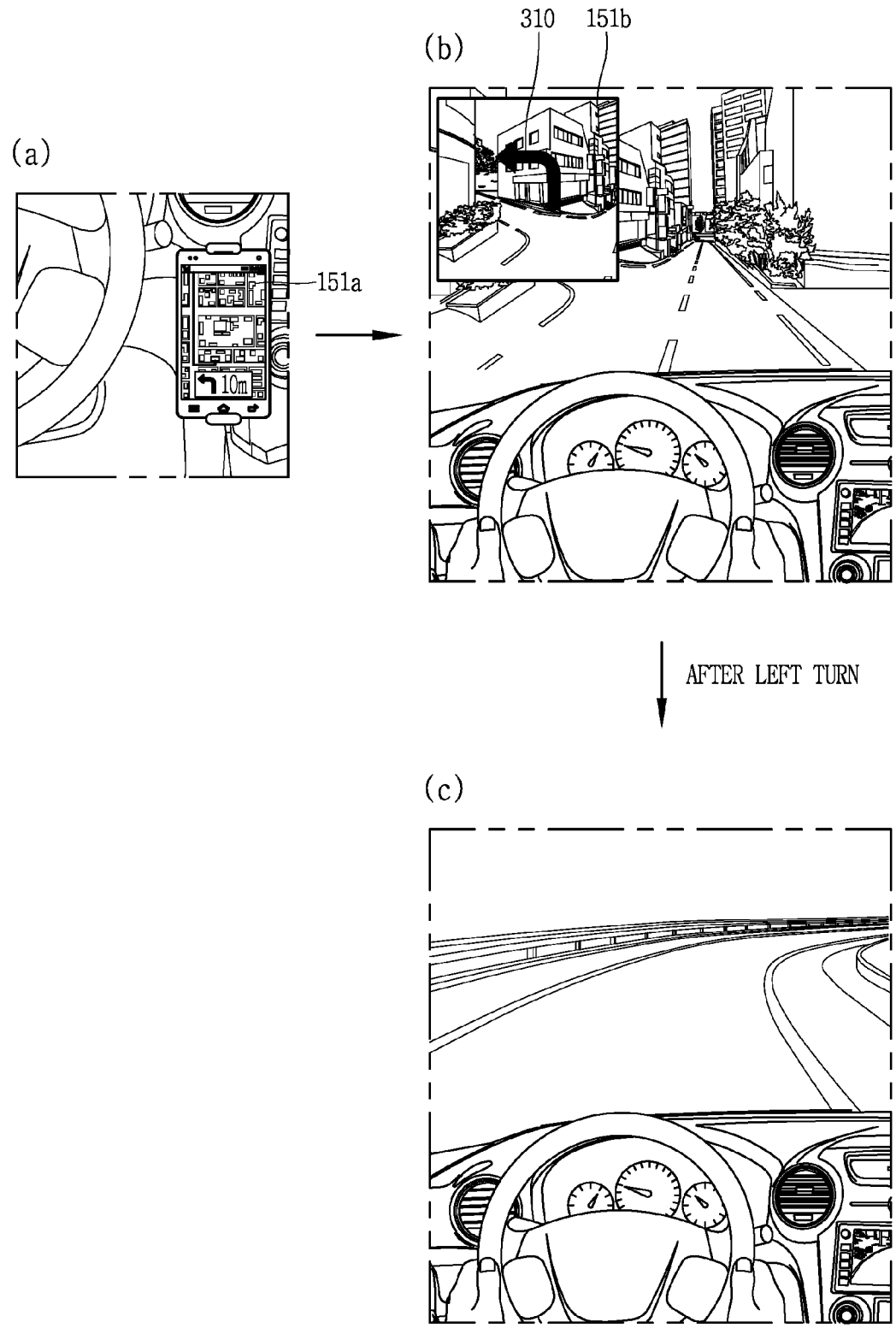
FIGS. 6A, 6B and 6C are conceptual views illustrating that information output on a transparent display apparatus disappears.
Figure 6B:
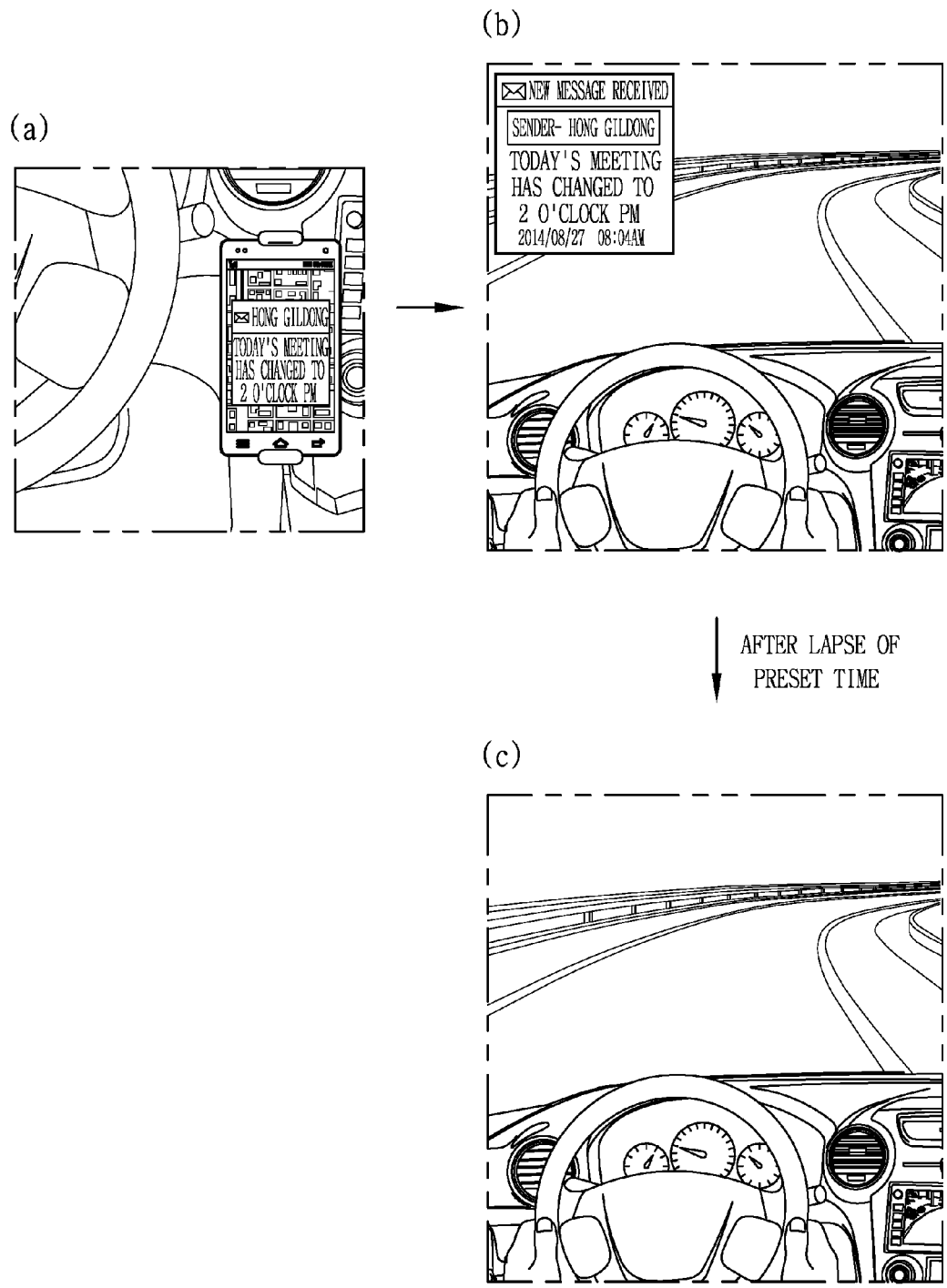
Figure 6C:
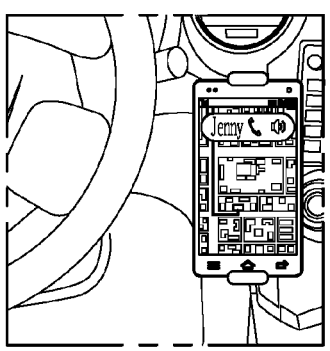
Figure 6C:
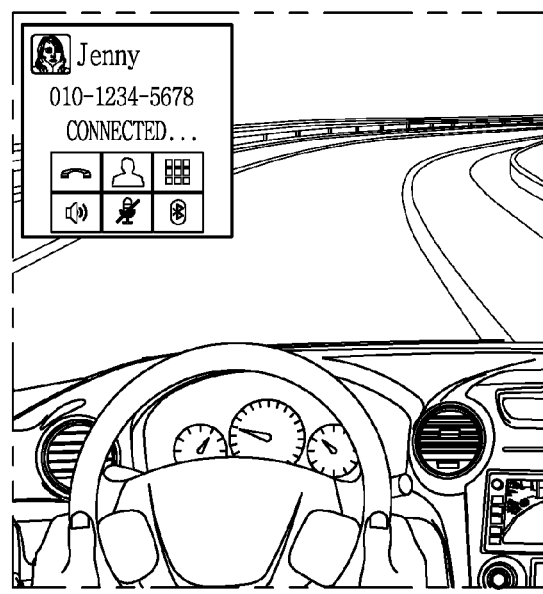
Figure 6C:
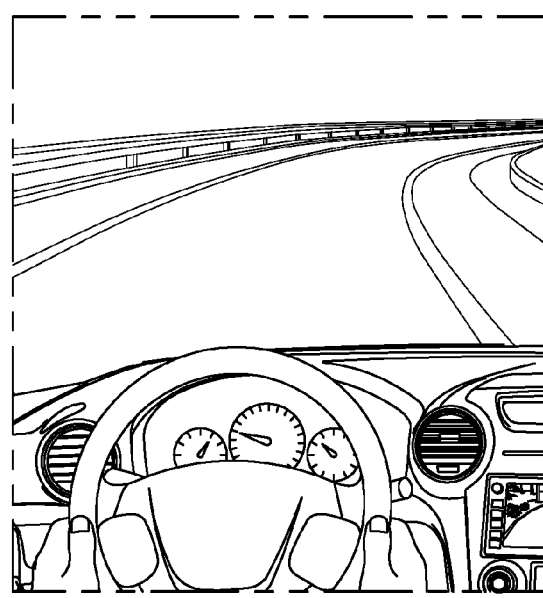

Hereinafter, a method in which information output on the transparent display apparatus disappears will be described. FIGS. 6A, 6B and 6C are conceptual views illustrating that information output on the transparent display apparatus disappears.

The present invention can output the information related to the path search function on the transparent display apparatus while the path search function is executed.

In this instance, when a preset condition is met, the controller 180 may control the information related to the path search function, output on the transparent display apparatus, to disappear from the transparent display apparatus.

Here, the preset condition may be a current location of the mobile terminal, whether or not a preset time has lapsed, or whether or not a currently-executed function has been terminated. Also, the preset condition may be a condition associated with at least one of a voice command and a gesture command received from the user.

For example, as illustrated in (a) and (b) of FIG. 6A, when the mobile terminal is expected to move to left from a current location, the controller 180 may control the transparent display apparatus to output a guide image 310 indicating the left direction and road information on the transparent display unit 151*b*.

Afterwards, when it is sensed that the mobile terminal has moved to left, the guide image 310 indicating the left direction and the road information may not be needed to be output anymore. Therefore, the controller 180 may control the transparent display apparatus not to output the guide image 310 and the road information anymore on the transparent display unit 151*b*. In more detail, the controller 180 may transmit a control command to the transparent display apparatus not to output the guide image 310 and the road information anymore.

When the control command is transmitted, as illustrated in (c) of FIG. 6A, the guide image 310 and the road information may not be output on the transparent display unit 151*b*.

Meanwhile, when a message or a call signal is received on the mobile terminal, the controller 180 may control the transparent display apparatus to output information related to the message or the call signal on the transparent display unit 151*b*. In more detail, the controller 180 may transmit the information related to the message or call signal to the transparent display apparatus.

As another example, as illustrated in (a) and (b) of FIG. 6B, when a message is received, the controller 180 may control the transparent display unit 151*b* to output details of the message on one area of the display unit 151*b*.

In this instance, when a preset condition is met, the controller 180 may control the details of the message to disappear from the transparent display unit 151*b*. In more detail, as illustrated in (c) of FIG. 6B, when a preset time is lapsed, the controller 180 may control the details of the message to disappear from the transparent display unit 151*b*.

As another example, as illustrated in (a) and (b) of FIG. 6C, when a call signal is received, the controller 180 may control the display unit 151*b* to output details associated with the call signal on one area of the transparent display unit 151*b*.

In this instance, the controller 180 may perform a call with an external terminal which has sent the call signal. Afterwards, as illustrated in (c) of FIG. 6C, when the call is terminated, the controller 180 may control the details associated with the call signal, output on the transparent display unit 151*b*, to disappear from the transparent display unit 151*b*. In this instance, the termination of the call may be received as one of a voice command and a gesture command.

Accordingly, when a message or a call signal is received on the mobile terminal, the user can be provided with a simple function associated with the mobile terminal even during driving.

Figure 7:
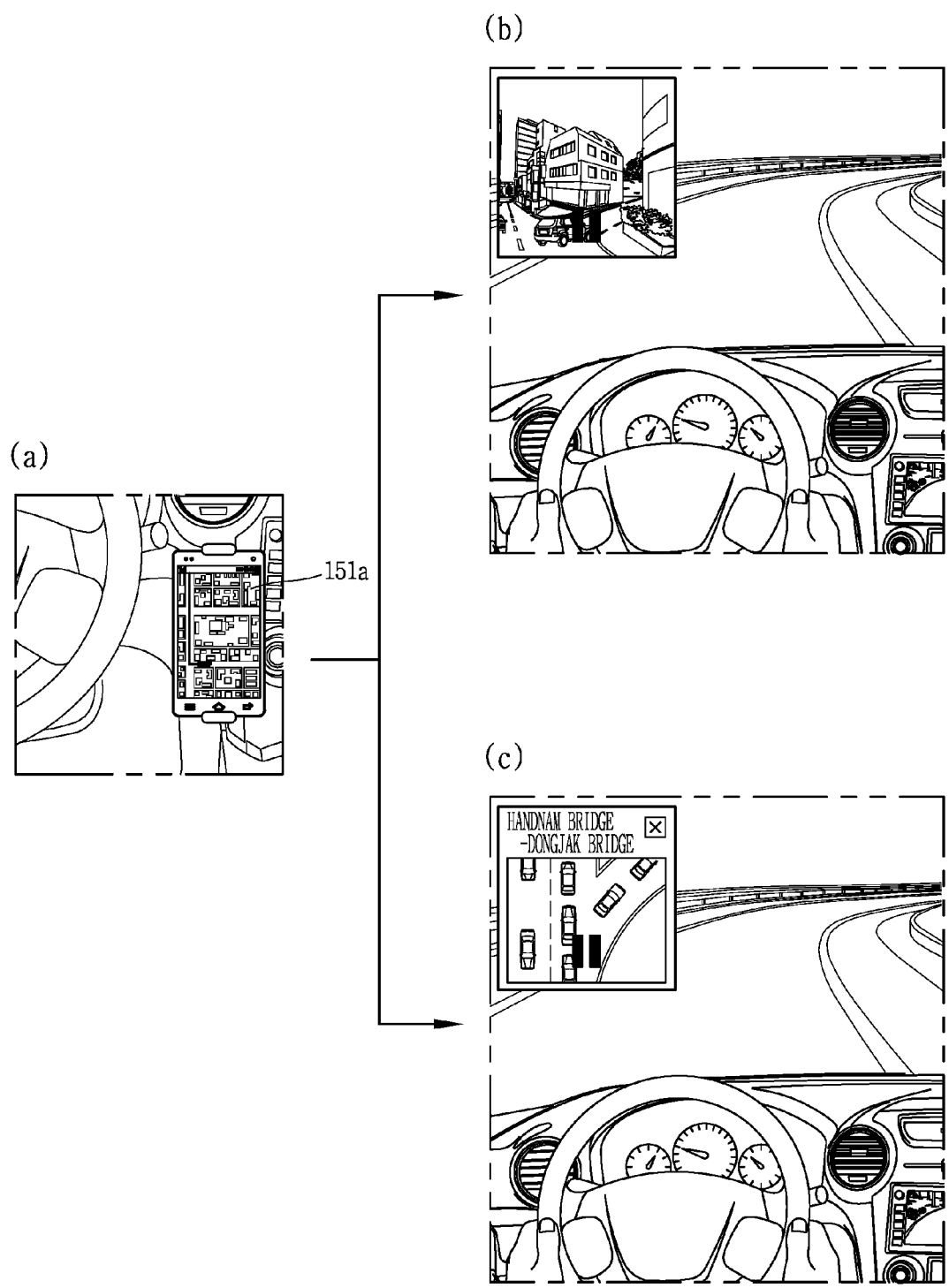
FIG. 7 is a conceptual view illustrating an image (or video) output on a transparent display apparatus.

So far, the method of controlling the information output on the transparent display apparatus to disappear from the transparent display apparatus has been described. Hereinafter, an image (video) output (reproduced) on the transparent display apparatus will be described. FIG. 7 is a conceptual view illustrating an image (video) output (reproduced) on the transparent display apparatus.

The present invention may further include a camera 121 for capturing an external image. Also, the present invention may capture an environment or situation of a currently-driving road through the camera 121 while performing the path search function.

Also, the present invention may receive information captured through the camera 121 installed at an outside. In this instance, the present invention may store the captured information in the memory 170 in association with location information.

In this instance, when a user request is received, the controller 180 may control the transparent display apparatus to output an image captured within a preset time interval on transparent the display unit 151b, on the basis of a current time. That is, the present invention can provide a scene of a street, which the user (driver) has missed during driving, by using the transparent display unit 151b. For example, as illustrated in (b) of FIG. 7, the image captured within the preset time interval may be output on one area of the transparent display unit 151b.

Also, the controller 180 may control the transparent display apparatus to output an image indicating a road condition at a specific location, other than a current location, on the transparent display unit 151b, on the basis of a user request.

In more detail, the controller 180 may receive an image captured by an external camera (e.g., CCTV installed on a road) from a preset server or directly from the external camera. Afterwards, the controller 180 may transmit the received image to the transparent display apparatus to output the received image on the transparent display unit 151b.

For example, as illustrated in (c) of FIG. 7, the image indicating the road condition may be reproduced on one area of the transparent display unit 151b.

In this instance, when the reproduction of the video is terminated, the controller 180 may control the transparent display apparatus not to output the image on the transparent display unit 151b any more. In more detail, the controller 180 may detect a reproduction time of the transmitted image, and control the transparent display apparatus not to output the image when the reproduction time is lapsed from a current time.

Accordingly, the user can be provided with an image of a street that the user has missed, and an image showing an external road condition.

Figure 8A:
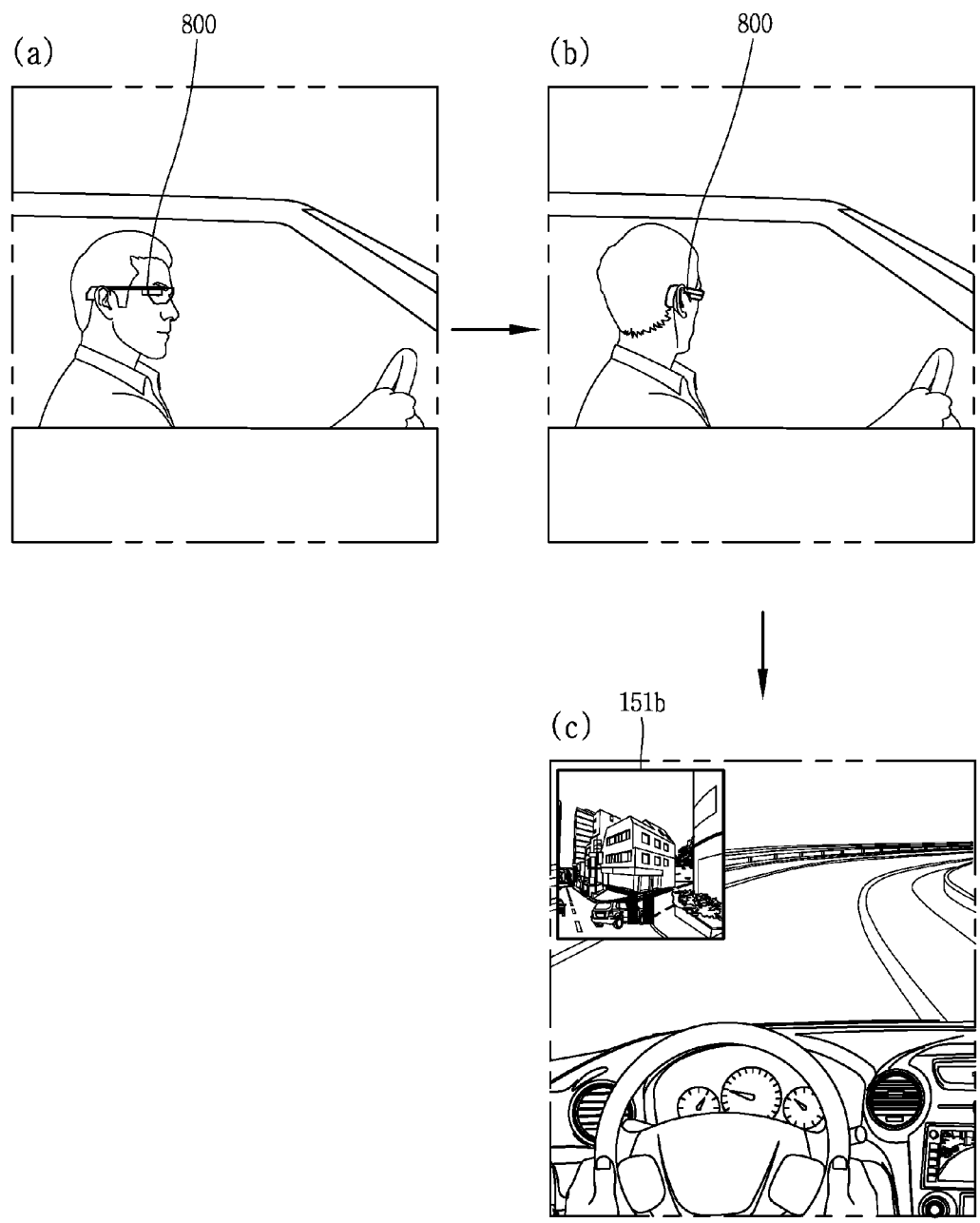
FIGS. 8A and 8B are conceptual views illustrating embodiments implemented in wearable devices.
Figure 8B:
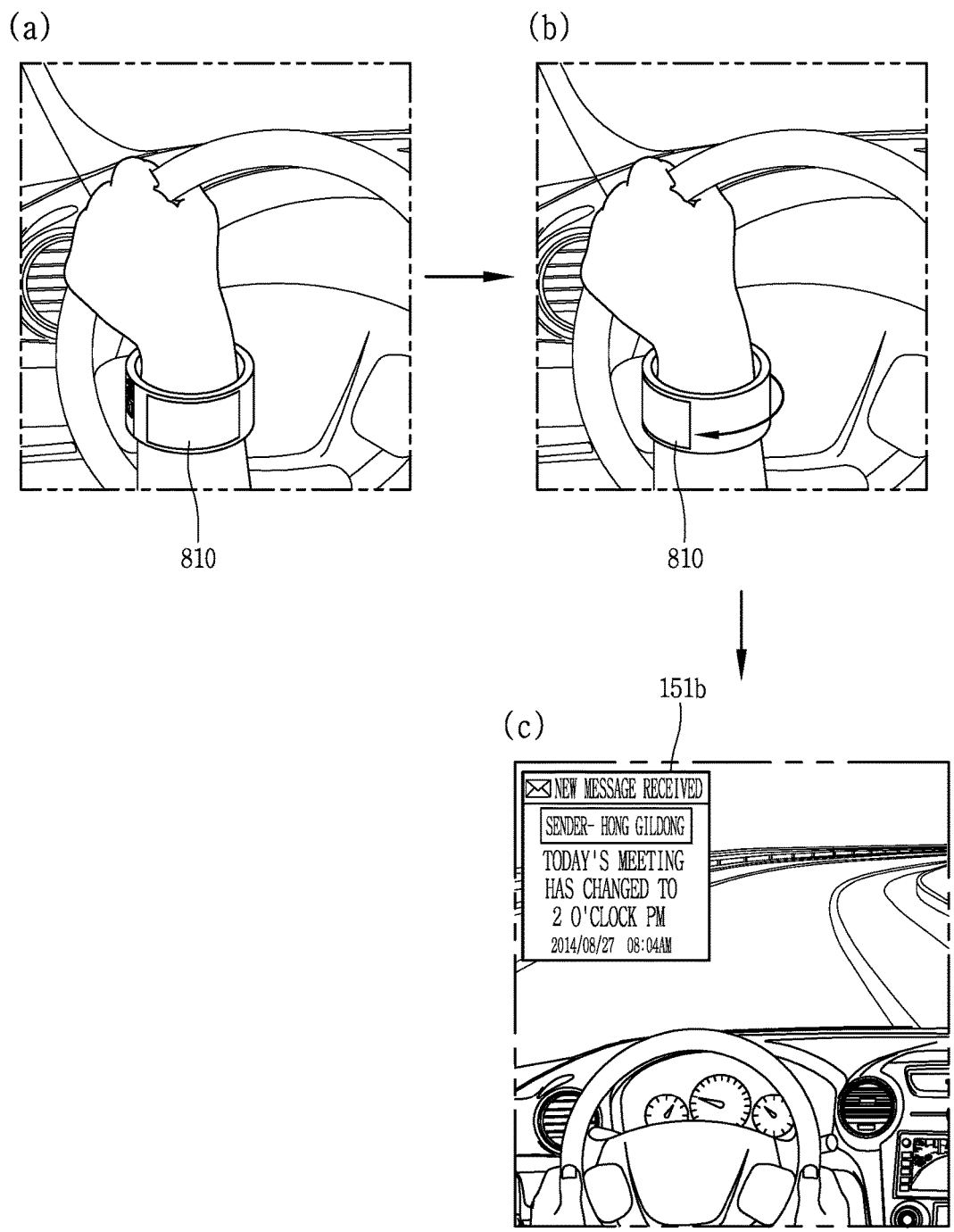

The foregoing description has been given of the method of outputting the image captured through the camera on the transparent display unit. Hereinafter, description will be given of embodiments of cooperating a wearable device as well as the mobile terminal with the transparent display apparatus. FIGS. 8A and 8B are conceptual views illustrating embodiments implemented in wearable devices.

The present invention can also be applied to wearable devices which perform similar functions to the mobile terminal, as well as the mobile terminal.

The wearable device may refer to a device which is wearable on a part of a user's body, and examples thereof may be a glass type, and a watch type. Hereinafter, embodiments implemented in the glass type and the watch type will be described, but the present invention may not be limited to these types of wearable devices. The present invention can be applied to any type of wearable device.

A glass type mobile terminal 800 may be mounted on a head portion, and thus control the transparent display unit 151b using a gesture of the head portion. In more detail, the glass type mobile terminal 800 may transmit a control command for controlling the transparent display apparatus by use of a motion of the head portion. In this instance, the glass type mobile terminal 800 may transmit a different control command according to the motion of the head portion.

For example, as illustrated in (a) and (b) of FIG. 8A, the glass type mobile terminal 800 may sense a motion of the user's head portion. Here, the motion of the head portion may refer to a motion of turning a head in a specific direction. In this instance, the glass type mobile terminal 800 may control the transparent display apparatus to output an image (video) captured for a preset time interval, starting from a current time, on the transparent display unit 151b. That is, the glass type mobile terminal 800 may transmit image (or video) information to the transparent display apparatus on the basis of the motion of the head portion.

When the image information is transmitted, the transparent display apparatus may output the image on one area of the transparent display unit 151b. For example, as illustrated in (c) of FIG. 8A, the image may be output on the transparent display unit 151b.

In addition, a watch type mobile terminal 810 may control the transparent display apparatus by sensing a motion of a wrist. For example, the motion of the wrist may refer to bending of the wrist, a motion of a muscle of the wrist, and the like.

For example, as illustrated in (a) and (b) of FIG. 8B, the watch type mobile terminal 810 may control the transparent display apparatus to output details of a message on the transparent display unit 151b, on the basis of a motion that the wrist is turned in a specific direction. In more detail, the watch type mobile terminal 810 may transmit the details of the message to the transparent display apparatus. In this instance, as illustrated in (c) of FIG. 8B, the details of the message may be output on the transparent display unit 151b. In this manner, the present invention can be used in various devices.

The present invention can transmit information related to screen information output on a display unit of a terminal to a transparent display apparatus such that the information related to the screen information output on the display unit can be output on the transparent display apparatus.

Accordingly, the user can be provided with information related to the screen information currently output on the terminal, by using the transparent display apparatus located within a viewing angle, even though the terminal does not belong to the viewing angle.

Also, the present invention can output road scene information on the transparent display apparatus under a complicated road condition, in the mobile terminal performing a path search function, thereby providing a screen similar to a real environment.

This may more facilitate the user to recognize a road condition by virtue of simultaneously recognizing the transparent display apparatus disposed on a front surface of a vehicle and a real road.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A mobile terminal cooperating with a transparent display apparatus, the mobile terminal comprising:
    a wireless communication unit capable of performing transmission and reception of information with the transparent display apparatus;
    a main body;
    a location receiving unit capable of receiving location information related to the main body;
    a display unit capable of outputting path search information; and
    a controller capable of transmitting screen information related to the path search information to the cooperative transparent display apparatus, through the wireless communication unit such that the screen information related to the path search information is output on the cooperative transparent display apparatus,
    wherein the controller transmits road information based on a location of the main body to the transparent display apparatus such that the road information is output on the transparent display apparatus, and
    wherein the controller transmits road information at a changed location such that the road information at the changed location is output on the transparent display apparatus, when the location of the main body changes.

2. The mobile terminal claim 1, wherein the controller further transmits information related to a direction to move to the transparent display apparatus such that a guide image indicating the direction to move is output on the road information in an overlapping manner.

3. The mobile terminal of claim 1, wherein the controller terminates a path search function when the main body arrives at a destination, and transmits destination building image information such that a building image of the destination is output on the transparent display apparatus.

4. The mobile terminal of claim 1, wherein the road information is output on the transparent display apparatus when a preset condition is met.

5. The mobile terminal of claim 4, wherein the controller transmits the road information to the transparent display apparatus such that the road information is output on the transparent display apparatus, when the direction that the main body is expected to move is a left turn or a right turn.

6. The mobile terminal of claim 5, wherein the controller transmits a control signal to the transparent display apparatus such that the road information disappears from the transparent display apparatus, when it is sensed that the main body has been turned to left or right.

7. A method for controlling a mobile terminal cooperating with a transparent display apparatus, the method comprising:
    outputting, via a display unit of the mobile terminal, path search information;
    transmitting, via a wireless communication unit of the mobile terminal, information related to the path search information to the transparent display apparatus such that the information related to the path search information is output on a transparent display unit provided on the transparent display apparatus;
    receiving, via a location receiving unit of the mobile terminal, location information related to a main body of the mobile terminal;
    transmitting, via a controller controlling the wireless communication unit, road information based on a location of the main body to the transparent display apparatus such that the road information is output on the transparent display apparatus; and
    transmitting, via the controller controlling the wireless communication unit, road information at a changed location such that the road information at the changed location is output on the transparent display apparatus, when the location of the main body changes.

* * * * *